United States Patent
Dabholkar et al.

(10) Patent No.: US 9,002,202 B2
(45) Date of Patent: Apr. 7, 2015

(54) METHOD AND SYSTEM FOR REDUCING THE RESOURCE UTILIZATION OF SWITCH FABRIC IN A SONET/SDH MULTIPLEXER BY SWITCHING DATA ON A TU LEVEL

(71) Applicant: Tejas Networks Limited, Bangalore, Karnataka (IN)

(72) Inventors: Prashant Prabhakar Dabholkar, Karnataka (IN); Devendra Kumar Chaudhary, Karnataka (IN)

(73) Assignee: Tejas Networks Limited (IN)

( * ) Notice: Subject to any disclaimer, the term of this patent is extended or adjusted under 35 U.S.C. 154(b) by 173 days.

(21) Appl. No.: 13/853,980

(22) Filed: Mar. 29, 2013

(65) Prior Publication Data

US 2013/0259477 A1  Oct. 3, 2013

(51) Int. Cl.
*H04Q 11/00* (2006.01)
*H04L 12/28* (2006.01)
*H04L 12/56* (2006.01)
*H04J 3/16* (2006.01)

(52) U.S. Cl.
CPC .......... *H04Q 11/0067* (2013.01); *H04J 3/1611* (2013.01)

(58) Field of Classification Search
USPC .................. 398/43, 45, 52; 370/388, 375
See application file for complete search history.

(56) References Cited

U.S. PATENT DOCUMENTS

| | | | |
|---|---|---|---|
| 7,630,414 B2* | 12/2009 | Clauberg | 370/540 |
| 2005/0068991 A1* | 3/2005 | Jarabek et al. | 370/516 |
| 2005/0108401 A1* | 5/2005 | Gonda | 709/227 |
| 2006/0233165 A1* | 10/2006 | Jarabek et al. | 370/389 |
| 2006/0239262 A1* | 10/2006 | Wu et al. | 370/389 |
| 2007/0140232 A1* | 6/2007 | Carson | 370/388 |
| 2013/0259477 A1* | 10/2013 | Dabholkar et al. | 398/52 |

* cited by examiner

*Primary Examiner* — Oommen Jacob
(74) *Attorney, Agent, or Firm* — Merchant & Gould P.C.

(57) ABSTRACT

The present invention relates to a method and apparatus for reducing the resource utilization of the switching fabric in a SONET/SDH multiplexer by switching data on a TU level instead of byte or column level.

4 Claims, 6 Drawing Sheets

| XC CAPACITY | No. of AUGs | DM storage bits | | | CM storage bits | | | Total storage bits | | |
|---|---|---|---|---|---|---|---|---|---|---|
| | | col-xc | tu-xc | % saving | col-xc | tu-xc | % saving | col-xc | tu-xc | % saving |
| 0.6G | 4 | 17280 | 5952 | 65.56 | 11880 | 3672 | 69.09 | 29160 | 9624 | 67.00 |
| 2.5G | 16 | 69120 | 23808 | 65.56 | 56160 | 17952 | 68.03 | 125280 | 41760 | 66.67 |
| 10G | 64 | 276480 | 95232 | 65.56 | 259200 | 84864 | 67.26 | 535680 | 180096 | 66.38 |
| 20G | 128 | 552960 | 190464 | 65.56 | 552960 | 182784 | 66.94 | 1105920 | 373248 | 66.25 |
| 40G | 256 | 1105920 | 380928 | 65.56 | 1175040 | 391680 | 66.67 | 2280960 | 772608 | 66.13 |
| 80G | 512 | 2211840 | 761856 | 65.56 | 2488320 | 835584 | 66.42 | 4700160 | 1597440 | 66.01 |
| 320G | 2048 | 8847360 | 3047424 | 65.56 | 11059200 | 3760128 | 66.00 | 19906560 | 6807552 | 65.80 |

FIG. 6

METHOD AND SYSTEM FOR REDUCING THE RESOURCE UTILIZATION OF SWITCH FABRIC IN A SONET/SDH MULTIPLEXER BY SWITCHING DATA ON A TU LEVEL

This application claims benefit of Serial No. 1293/CHE/2012, filed 31 Mar. 2012 in India and which application is incorporated herein by reference. To the extent appropriate, a claim of priority is made to the above disclosed application.

FIELD OF THE INVENTION

The present invention relates to a method and a system for a switch fabric in SONET/SDH telecommunication systems. In particular, the invention relates to a switch fabric in a SONET/SDH multiplexer that switches data on a TU level.

BACKGROUND OF THE INVENTION

In SDH networks and SONET networks, the scope of the network management correlates tasks with the number of channels transmitted simultaneously (SDH=synchronous digital hierarchy and SONET=synchronous optical network). The more channels that are transmitted, the more tasks have to be carried out. The tasks include, for example, configuration, administration, maintenance and supervision. Owing to the ever-increasing requirement for data transmission, the available number of transmission channels in the backbone network increase continuously.

One of the primary functions in a SONET SDH ring is the addition and deletion of circuits at each of the add-drop multiplexers (ADMs) that constitute the ring. This function is generally performed by the cross connect or switch fabric that is central to the ADM. The cross connect fabric will generally receive frame aligned data from each of the optical or electrical interfaces present on the ADM. Assuming that the switch follows a TSI (Time slot interchanger) architecture, depending on the configuration of the ADM, the time stage of the fabric cross connects the data from a given time slot in the incoming data stream to a time slot in any of the outgoing data streams. This necessitates the configuration of the time stage of the cross connect on a per time slot basis.

A typical STM-1 SDH ADM has the following components as shown in FIG. 1.
a) one STM1 east interface and the associated processing functions (100)
b) one STM1 west interface and the associated processing functions (101)
c) 63 E1 or 84 DS1 interfaces and the associated mapping functions (102)
d) 3 E3 interfaces and the associated mapping functions (103)
e) "time stage only" switch including the frame reference and address generation function (104).

Each of the interface blocks 100, 101, 102 and 103 pump data towards the central switch fabric 104 at STM1 rate over the links 105, 106, 107 and 108. Thus for the ADM to be able to cross connect any of the byte in the coming frame to any of the byte in the outgoing frame, one need to store at least
a) (270×9) bytes of telecom data per interface
b) (270×9) words of configuration information per interface.

In a typical SDH ADM generally it is not required to switch data on a byte level, but only at a TU12 or TU11 level. Further, assuming that all the interface blocks 100, 101, 102 and 103 pump data towards the central switch fabric 104 with their frames aligned and the J1 bytes aligned, the data in a given column of the incoming SDH frame would correspond to the same TU12 or TU11 or TU3 irrespective of the row it is in. Hence it is required to store only
a) 270 bytes of telecom data per interface
b) 270 words of configuration information per interface Further assuming that the data coming towards the central switch fabric 104 on links 105, 106 and 107 contain only TU12s or TU11s, then one can further reduce the amount of storage and configuration information required as follows
1) If the incoming data stream contains only TU12s, then we are required to store at least
   (a) 63 bytes of telecom data per interface
   (b) 63 words of connection information per interface.
   This is because in an SDH frame, the same TU12 number repeats after 63 columns
2) If the incoming data stream contains only TU11s, then we are required to store at least
   (a) 84 bytes of telecom data per interface
   (b) 84 words of connection information per interface.
   This is because in an SDH frame, the same TU11 number repeats after 84 columns.

However there would be a problem in storing the telecom data and the connection information if the incoming data stream contains a mix of TU11 and TU12. Existing techniques solve the problem of switching TU11 and TU12 simultaneously by making the fabric, switch at a column level (essentially column level switch). Since all the bytes for any TU12 falls in fixed four columns and all the bytes for a TU11 falls in fixed three columns this is a viable solution. However this scheme needs more storage (ideally we need to store only 1 of the 4 bytes of TU12 in a row and 1 of the 3 bytes of TU 11 in row).

Therefore, there is a need to overcome the above restriction or problem which has an effective and efficient method and apparatus for reducing the resource utilization of the switching fabric in a SONET/SDH Multiplexer instead of byte or column level.

SUMMARY OF THE INVENTION

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance, one aspect of the present invention is a method of switching data on a TU Level in a SONET/SDH network, the method comprising:
writing at least one first set of data into a first memory element or page during a first time interval, wherein the memory consists of 8 pages to store the payload data, wherein each page includes 21 location and each location includes one byte, writing at least one second set of data into a second memory element during a second time interval, reading a portion of the first set of data from the first memory element during the second time interval and reading a portion of the second set of data from the second memory element during the first time interval, wherein the write and read operation is switched at page level by modifying the page structure of the cross connect and controlling the page number based on the TU configuration, and wherein the first time interval and second time interval are non-consecutive.

In another aspect of the present invention is a system of switching data on a TU Level in a SONET/SDH network, the system comprising: an input write bus, a first memory element in electrical communication with the input write bus, a second memory element in electrical communication with the input write bus and a circuitry configured to writing at least one first set of data into a first memory element or page during a first time interval, wherein the memory consists of 8 pages to store the payload data, wherein each page includes 21 location and each location includes one byte, writing at least one second set of data into a second memory element during a second time interval, reading a portion of the first set of data from the first memory element during the second time interval and reading a portion of the second set of data from the second memory element during the first time interval, wherein the write and read operation is switched at page level by modifying the page structure of the cross connect and controlling the page number based on the TU configuration, and wherein the first time interval and second time interval are non-consecutive.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the detailed description of the invention below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which:

FIG. 6 shows data memory, connection memory and the total memory for various cross connect sizes according to one embodiment of the present invention.

Persons skilled in the art will appreciate that elements in the figures are illustrated for simplicity and clarity and may have not been drawn to scale. For example, the dimensions of some of the elements in the figure may be exaggerated relative to other elements to help to improve understanding of various exemplary embodiments of the present disclosure.

Throughout the drawings, it should be noted that like reference numbers are used to depict the same or similar elements, features, and structures.

DETAILED DESCRIPTION OF THE INVENTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Figure 1:
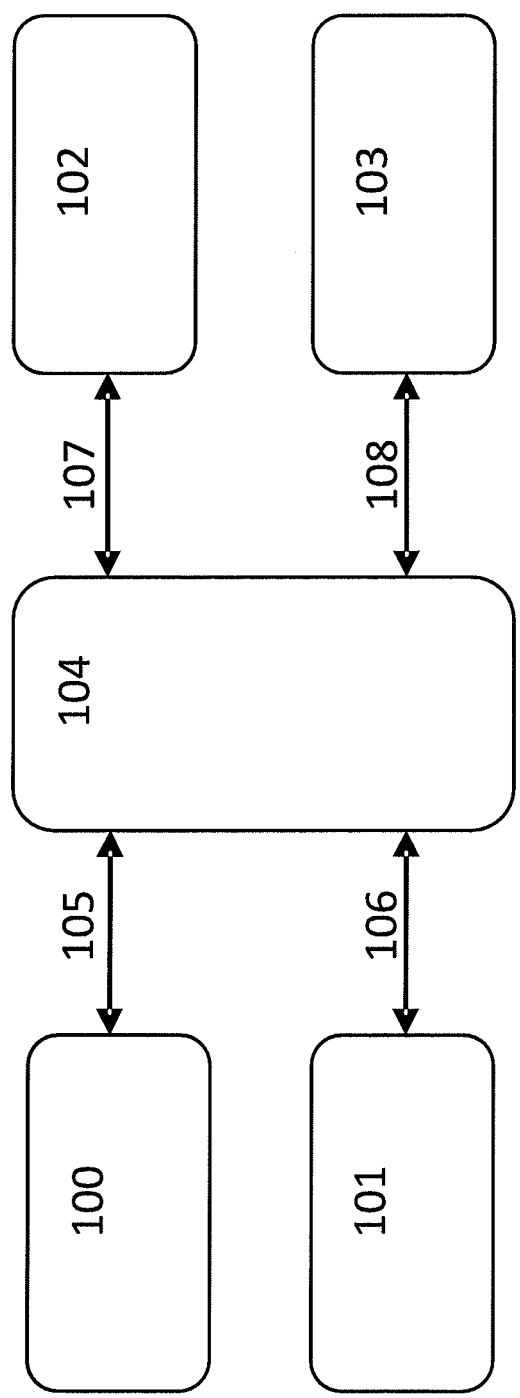
FIG. 1 shows a conventional two port cross connect of a network element (NE).
Figure 2:
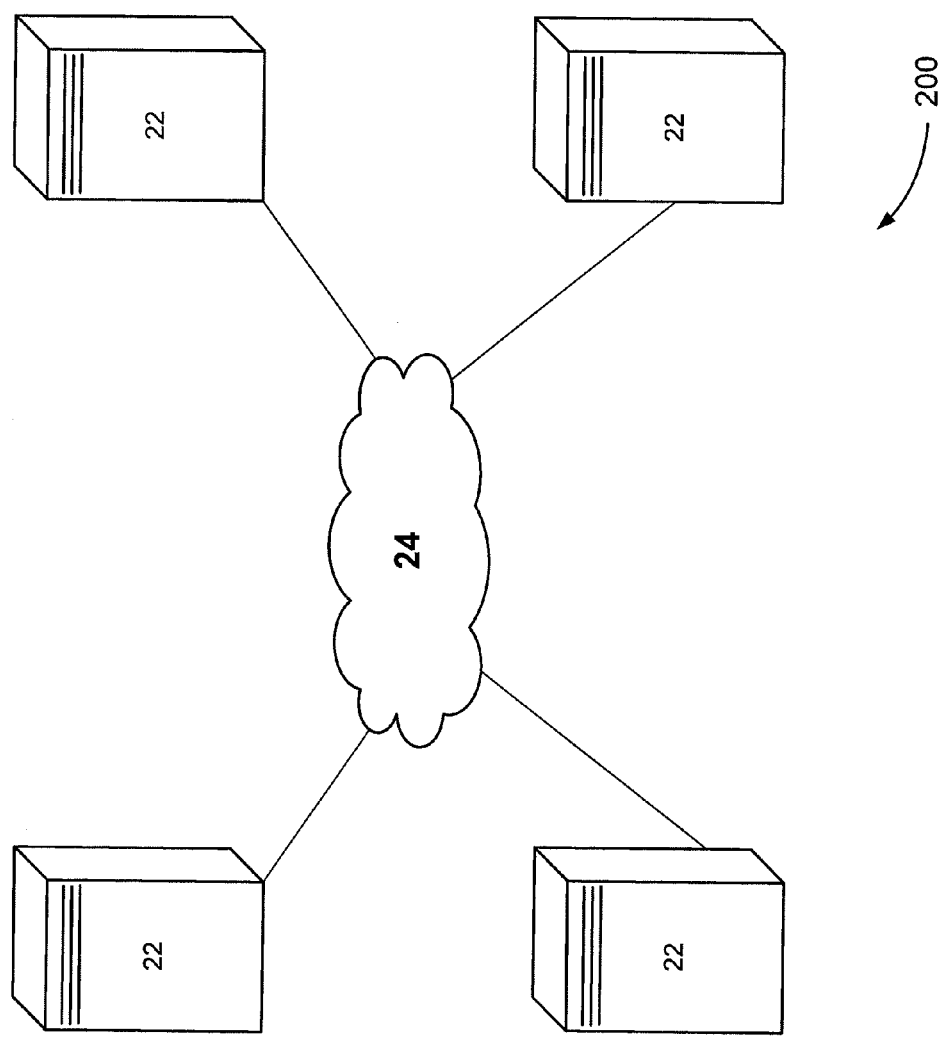
FIG. 2 shows a typical block diagram of a network.

Referring to FIG. 2, a network 20 includes a plurality of network elements 22 in communication using a network infrastructure 24. The network infrastructure 24 may include network elements or nodes, and/or sub-networks. The network elements include synchronous transmission apparatus such as a multiplexer, a regenerator, or a cross-connect (not shown). In one example, the network can be a synchronous optical network (SONET) and/or synchronous digital hierarchy (SDH) network. Network elements 22 in network 20 switch data traffic.

An application specific integrated circuit (ASIC) provides cross-connection and protocol conversion functions. The implementation may also bused on FPGA. The ASIC includes a random access memory (RAM) that provides a cross-connection between a plurality of input ports and a corresponding plurality of output ports. Associated core logic controls the writing of incoming data to the RAM and subsequent reading of outgoing data from the RAM to provide cross-connection, format conversion, and channel reordering functionality.

In SDH/SONET networks, it is desirable for a switching element to switch data payloads at the higher order (e.g., at STS, VC-3 or VC-4 level) and at the lower order level (e.g., at VT1.5, VT2, TU-11 or TU-12 level). In a SONET network, high order switching is referred to as STS switching, and a high order switch is referred to as an STS switch, while low order switching is referred to as VT switching and a low order switch is referred to as a VT switch. It will be understood however that the invention applies to equivalent SDH, and other, structures and apparatus (e.g. TU switching and TU alignment).

Figure 3:
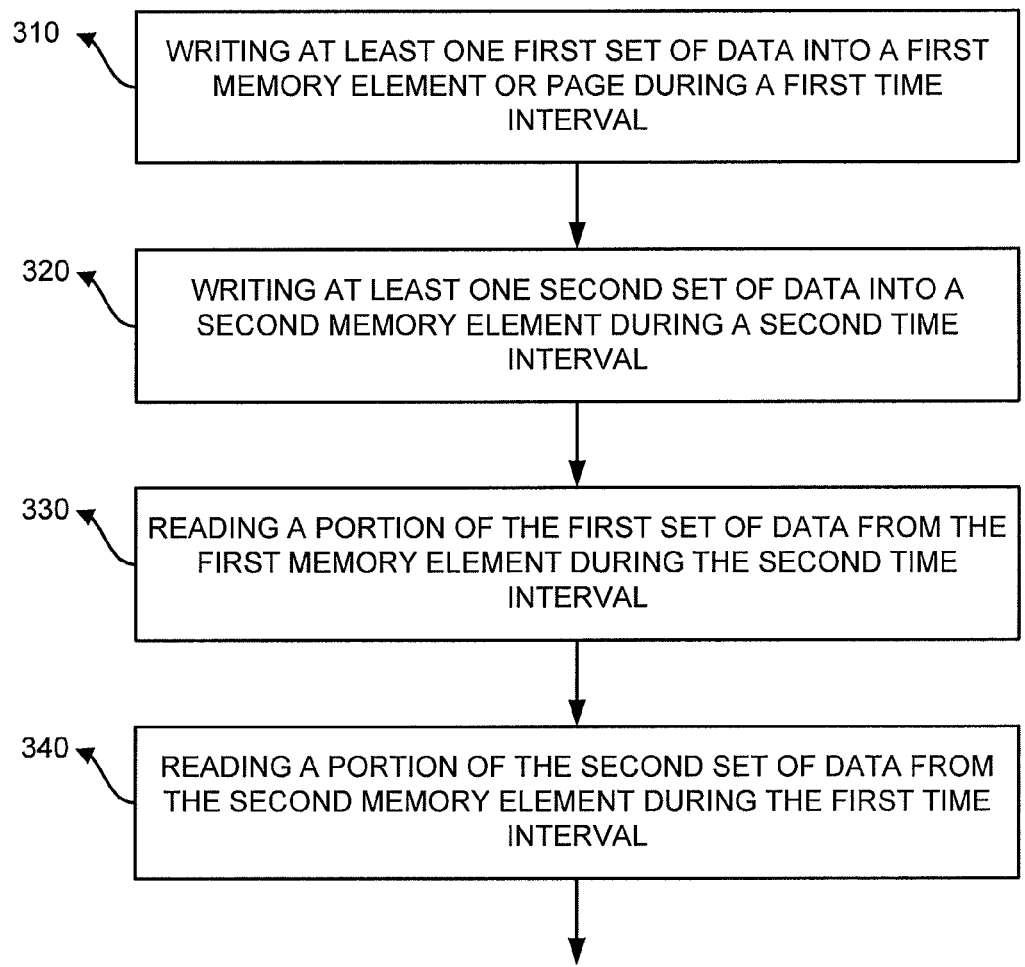
FIG. 3 shows flow chart of a method switching data on a TU Level in a SONET/SDH network according to one embodiment of the present invention.

FIG. 3 shows flow chart of a method switching data on a TU Level in a SONET/SDH network according to one embodiment of the present invention.

At step 310, the method writes at least one first set of data into a first memory element or page during a first time interval, wherein the memory consists of 8 pages to store the payload data, wherein each page includes 21 location and each location includes one byte The first memory is the data memory. The Data Memory (DM) stores the incoming telecom data coming from each of the input ports.

At step 320, the method writes at least one second set of data into a second memory element during a second time interval.

At step 330, the method reads a portion of the second set of data from the second memory element during the first time interval.

At step 340, the method reads a portion of the second set of data from the second memory element during the first time interval.

The write and read operation is switched at page level by modifying the page structure of the cross connect and controlling the page number based on the TU configuration, and the first time interval and second time interval are non-consecutive.

The writing of the second page while reading from the first page according to the configuration information, where storing and reconfiguring only some of the bytes that form the TU12s or TU11s in an STM-1 frame, wherein the TU12s and TU11s are byte interleaved in the STM-1 frame of the cross connect fabric.

Figure 4:
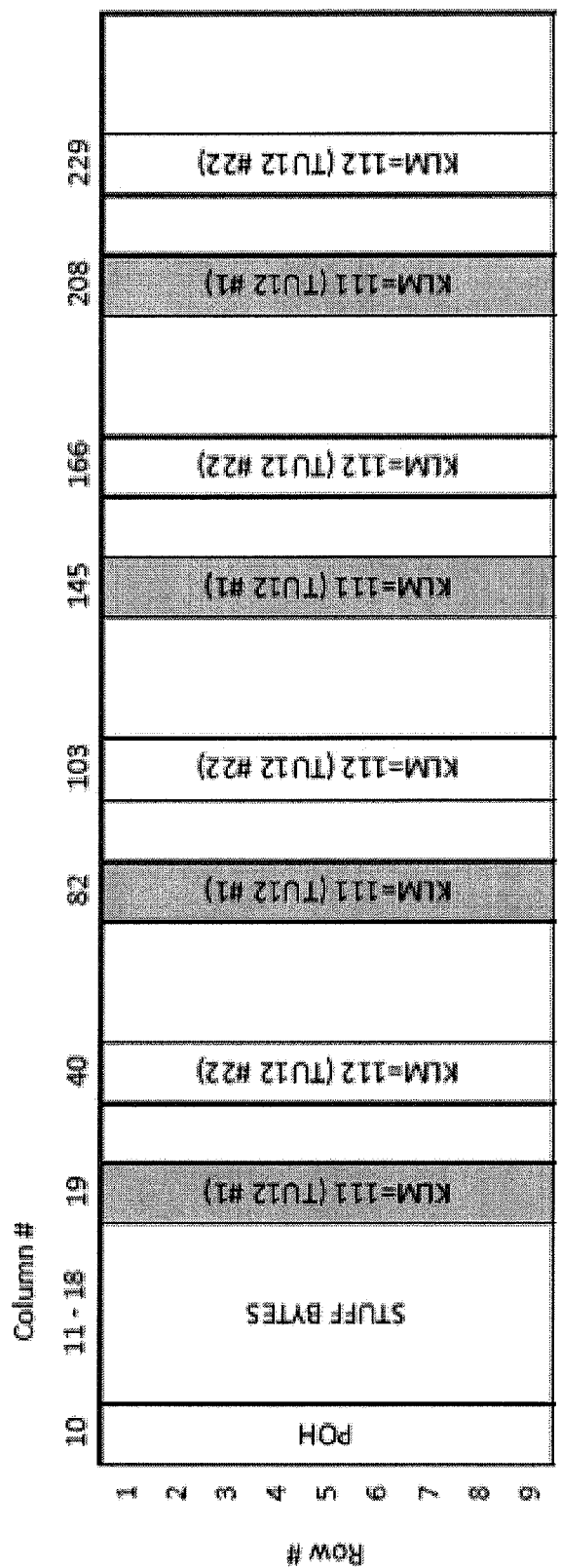
FIG. 4 showing TU12s and TU11s are byte interleaved in an STM-1 frame according to one embodiment of the present invention.

In one embodiment, assuming that the incoming data contains only TU12s or TU11s exclusively, then in the cross connect fabric one need to store and reconfigure only the bytes that form the 63 TU12s (63×4=252 bytes) or the 84 TU11s (84×3=252 bytes) in an STM-1 frame. Additionally, since the TU12s and TU11s are byte interleaved in an STM-1 frame as shown in the FIG. 4, we need not wait till all 4 bytes of the TU12 (marked in grey in the diagram below) or all 3 bytes of the TU11 in a row are written into the data memory. Once one set of 63 bytes for TU12 or 84 bytes for TU11 are written into the data memory, we can swap pages and start writing to the second page while reading from the first page according to the configuration information.

Thus for each STM1
1. In case of only TU12s.
Data memory requirement is (2 pages×(2 ports×63)) locations. Each location is one byte.
Configuration memory requirement (2 ports×63) locations. Each location has to address 63×2 locations in the data memory, so the number of bits required is 7.
The latency of the cross connect fabric in this case is 63 clocks
2. In case of only TU11s
Data memory requirement is (2 pages×(2 ports×84)) locations. Each location is one byte.
Configuration memory requirement (2 ports×84) locations. Each location has to address 84×2 locations in the data memory, so the number of bits required is 8.
The latency of the cross connect fabric in this case is 84 clocks.

The present method thus provides this reduction in storage memory requirement over a column-based or byte based cross connect. Further, the method also provides a method of partitioning the data memory and the configuration memory which allow switching even if the incoming data stream contains a mix of TU11s and TU12s. In addition to TU11s and TU12s the method supports VC4 and VC3 cross connects in the same fabric through additional storage for the overhead.

The data memory unit in the TU-based cross connect consists of 8 pages called as DPAGE to store the payload data, instead of 2 pages that we have seen earlier. Each page is 21 locations deep and each location is one byte. Thus each page stores the data corresponding to one column of all the TUs in an AUG having the same TU number but different TUG3 (1-3) and TUG2 (1-7) number. In addition to the 8 pages for payload data, the system has one page called as OHPAGE; 18 locations deep for storing the data bytes that are not part of the TU12s. These bytes include
  1. 9 bytes of the Section Overhead
  2. 1 byte of the Path Overhead.
  3. Additional bytes depending on the payload type.
    a. For lower order payloads (TU11/TU12/TU3)
      i. 2 columns of FIXED STUFF per AUG.
      ii. 2 columns of STUFF bytes per TUG3 per AUG, i.e. 6 STUFF columns per AUG
    b. For higher order payloads (VC4) 8 columns of VALID DATA per AUG Thus the OHPAGE holds 18 bytes in all per STM-1.

In an STM-1 frame, the OHPAGE and the DPAGEs are written to in the following manner.

|  |  |  | TU12 | | TU11 | |
| --- | --- | --- | --- | --- | --- | --- |
| PAGE | K | L | M | Column | N | Column |
| OHPAGE | 0-2 | — | — | — | — | — |
| DPAGE 1 | 0-2 | 0-6 | 1 | A | 1 | A |
| DPAGE 2 | 0-2 | 0-6 | 2 | A | 2 | A |
| DPAGE 3 | 0-2 | 0-6 | 3 | A | 3 | A |
| DPAGE 4 | 0-2 | 0-6 | 1 | B | 4 | A |
| DPAGE 5 | 0-2 | 0-6 | 2 | B | 1 | B |
| DPAGE 6 | 0-2 | 0-6 | 3 | B | 2 | B |
| DPAGE 7 | 0-2 | 0-6 | 1 | C | 3 | B |
| DPAGE 8 | 0-2 | 0-6 | 2 | C | 4 | B |
| DPAGE 1 | 0-2 | 0-6 | 3 | C | 1 | C |
| DPAGE 2 | 0-2 | 0-6 | 1 | D | 2 | C |
| DPAGE 3 | 0-2 | 0-6 | 2 | D | 3 | C |
| DPAGE 4 | 0-2 | 0-6 | 3 | D | 4 | C |
| OHPAGE | 0-2 | — | — | — | — | — |
| DPAGE 5 | 0-2 | 0-6 | 1 | A | 1 | A |
| DPAGE 6 | 0-2 | 0-6 | 2 | A | 2 | A |
| DPAGE 7 | 0-2 | 0-6 | 3 | A | 3 | A |

Each location in a DPAGE corresponds to a unique TUG2 in the STM-1 frame, one can thus configure the cross connect to be at TU11 or TU12 granularity on a TUG2 level. This also means that the same DPAGE is used for storing TU11 data or TU12 data depending on the TUG2 that it is a part of. Taking a typical DPAGE-DPAGE #4, the data bytes in each of the individual locations can be as follows.

| Location # | TUG3 # | TUG2 # | CONFIG | TU # | TU COL # |
|---|---|---|---|---|---|
| 1 | 1 | 1 | TU12 | 2 | C |
| 2 | 2 | 1 | TU12 | 2 | C |
| 3 | 3 | 1 | TU12 | 2 | C |
| 4 | 1 | 2 | TU11 | 4 | B |
| 5 | 2 | 2 | TU12 | 2 | C |
| 6 | 3 | 2 | TU11 | 4 | B |
| 7 | 1 | 3 | TU12 | 2 | C |
| 8 | 2 | 3 | TU11 | 4 | B |
| 9 | 3 | 3 | TU11 | 4 | B |
| . | . | . | . | . | . |
| . | . | . | . | . | . |
| . | . | . | . | . | . |
| 17 | 2 | 6 | TU12 | 2 | C |
| 18 | 3 | 6 | TU12 | 2 | C |
| 19 | 1 | 7 | TU12 | 2 | C |
| 20 | 2 | 7 | TU11 | 4 | B |
| 21 | 3 | 7 | TU11 | 4 | B |

Figure 5:
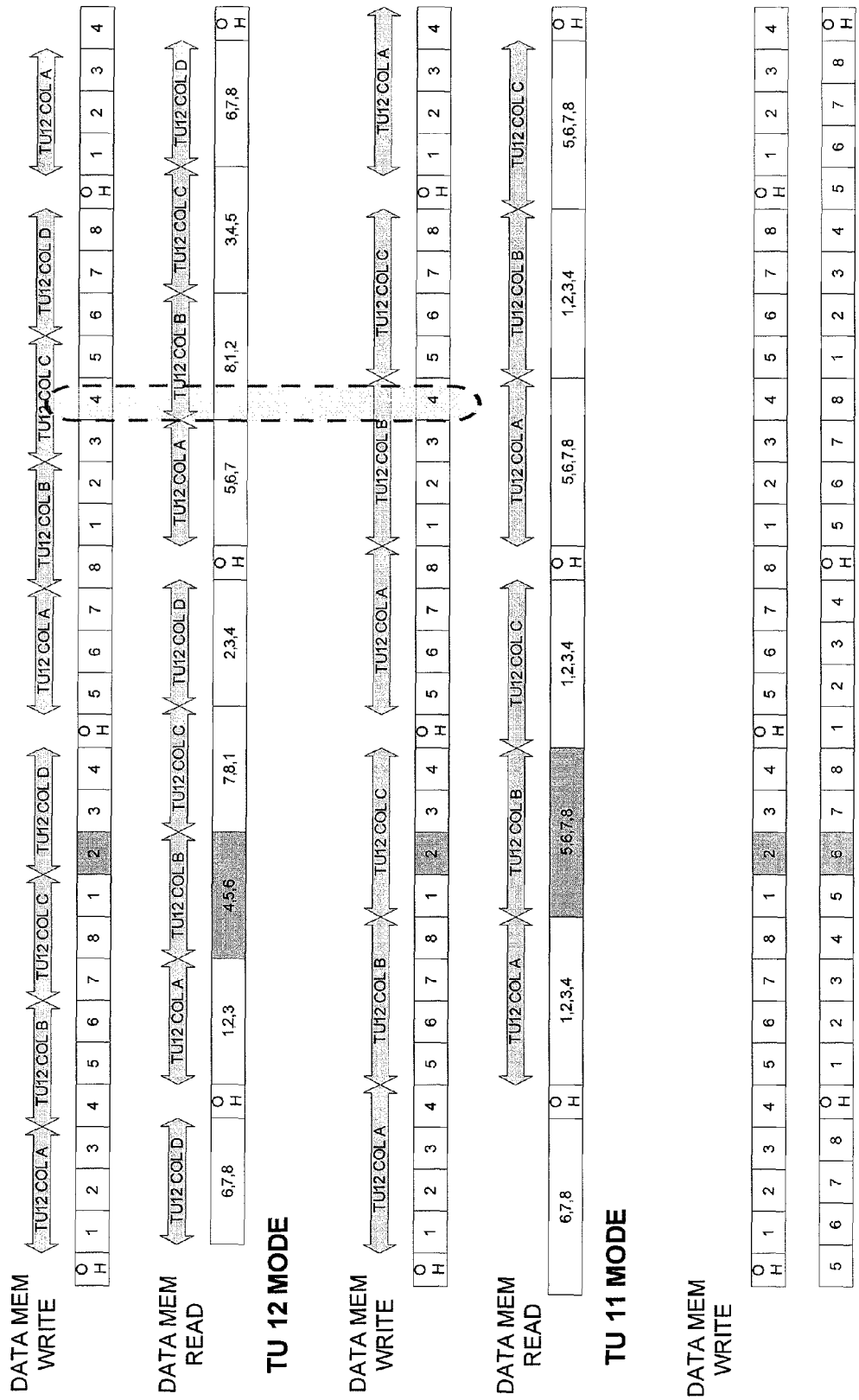
FIG. 5 shows DPAGE used for storing TU11 data or TU12 data according to one embodiment of the present invention.

The DPAGE #4 has also been marked in the diagram (FIG. 5) and it can store data of COL C of the $2^{nd}$ TU12 (m=2) as well as data of COL B of the $4^{th}$ TU11 (n=4)

Now the latency of the TU-based cross connect is defined by the latency of the TU11 cross connect, since one need to at least wait for all the TU bytes in a frame to arrive before they can be read out. Thus irrespective of whether having TU11/TU12/TU3/VC4 circuit that has to be cross connected, one have to wait for 84 clocks before the read operation can begin.

The write addresses for the DPAGEs in the DM are computed by using the following counters and enable signals that are generated in the TMG module.

1. WR_OH ENABLE—This is high over the first 18 cycles of each row in an STM-1 frame.
2. WR_TU ENABLE—This is high for 270−18=252 cycles of each row in an STM-1 frame.
3. WR_COL_CNTR—(0 to 89) increments every 3 cycles in an STM-1 frame.
4. WR_K_CNTR—(0 to 2) increments every cycle in an STM-1 frame.
5. WR_L_CNTR—(0 to 6) increments every 3 cycles in an STM-1 frame when WR_TU_ENABLE=1, tied to zero when WR_TU_ENABLE=0.
6. WR_M_CNTR—(0 to 2) increments every 21 cycles in an STM-1 frame when WR_TU_ENABLE=1, tied to zero when WR_TU_ENABLE=0.
7. WR_N_CNTR—(0 to 3) increments every 21 cycles in an STM-1 frame when WR_TU_ENABLE=1, tied to zero when WR_TU_ENABLE=0.
8. WR_PG—(0 to 7) increments every 21 cycles in an STM-1 frame, when WR_TU_ENABLE=1, tied to zero when WR_TU_ENABLE=0.

These counters are reset on the framing pulse input of the timing block, since the data input to the tu-xc fabric is frame aligned to the same framing pulse.

The read addresses for the DPAGEs are obtained from the configuration information in the CM. The read address for the CM is generated by read-side counters that are similar to the write-side counters but delayed by 84 clocks.

1. RD_OH ENABLE—This is high over the first 18 cycles of each row in an STM-1 frame.
2. RD_TU ENABLE—This is high for 270−18=252 cycles of each row in an STM-1 frame.
3. RD_COL_CNTR—(0 to 89) increments every 3 cycles in an STM-1 frame.
4. RD_K_CNTR—(0 to 2) increments every cycle in an STM-1 frame.
5. RD_L_CNTR—(0 to 6) increments every 3 cycles in an STM-1 frame when RD_TU_ENABLE=1, tied to zero when RD_TU_ENABLE=0
6. RD_M_CNTR—(0 to 2) increments every 21 cycles in an STM-1 frame when RD_TU_ENABLE=1, tied to zero when RD_TU_ENABLE=0
7. RD_N_CNTR—(0 to 3) increments every 21 cycles in an STM-1 frame when RD_TU_ENABLE=1, tied to zero when RD_TU_ENABLE=0

In addition the following counters are specific to the read side.

8. RD_PG_BASE_TU11—Indicates the first page of the set of 4 DPAGEs (84 locations) from which data has to be read out in case of TU11 payload. This count increments by 4 every 84 clocks.
9. RD_PG_BASE_TU12—Indicates the first page of the set of 3 DPAGEs (63 locations) from which data has to be read out in case of TU12 payload. This count increments by 3 every 63 clocks.

The Data Memory is partitioned into DPAGES in such a way that at any point of time a particular page is either in read mode or in write mode, but never both.

Assume at time t, we are writing to the shaded DPAGE #2, at location K=2, L=3. Assuming that K=2, L=3 is configured as TU11, thus in shaded DPAGE #2, the N value is 2

At the same time, reading the CM configuration information corresponding to K=2, L=3.

If the TUG2 is configured as a TU11, then to read the configuration information corresponding to N=2. The RD_PAGE_BASE_TU11 value is 5

If the configuration information indicates that the output data is to be picked up from K=3, L=6, N=2, then this N value is added to the current RD_PAGE_BASE_TU11 value to get the final RD_DPAGE number (5+2=7). The K and L values are used to access the specific location in the RD_DPAGE. In this specific case, DPAGE=2 is open for writing and DPAGES=5, 6, 7, 8 are open for reading.

If the TUG2 is configured as a TU12, then to read the configuration information corresponding to N=3, The RD_PAGE_BASE_TU12 value is 4.

If the configuration information indicates that the output data is to be picked up from K=3, L=6, M=2, then this M value is added to the current RD_PAGE_BASE_TU12 value to get the final RD_DPAGE (4+2=6) number. The K and L values are used to access the specific location in the RD_DPAGE. In this specific case, DPAGE=2 is open for writing and DPAGES=4, 5, 6 are open for reading One can thus see that though the configuration information written in both the cases is same, the actual DPAGE accessed for reading the data is different because the configuration of the TUG2 is different. The actual DPAGE accessed changes every clock because, we access a different TUG2 every clock.

A TU3, VC3 or VC4 is achieved by configuring the constituent TUG2s in the TU12 mode and using the OHPAGE to store the bytes that are not covered by the 8 DPAGES.

The savings in DM and CM and total memory for various cross connect sizes are shown in FIG. 6.

It is to be understood that the claims are not limited to the precise configuration and components illustrated above. Various modifications, changes and variations may be made in the arrangement, operation and details of the methods and apparatus described above without departing from the scope of the claims.

We claim:

1. A method of switching data on a TU Level in a SONET/SDH network, the method comprising:
   writing at least one first set of data into a first memory element or page during a first time interval, wherein the memory consists of 8 pages to store the payload data, wherein each page includes 21 locations and each location includes one byte;
   writing at least one second set of data into a second memory element during a second time interval;
   reading a portion of the first set of data from the first memory element during the second time interval;
   and reading a portion of the second set of data from the second memory element during the first time interval,
   wherein the write and read operation is switched at page level by modifying the page structure of the cross connect and controlling the page number based on a TU configuration, and wherein the first time interval and second time interval are non-consecutive.

2. The method of claim 1, wherein storing and reconfiguring only some of the bytes that form the TU12s or TU11s in an STM-1 frame, wherein the TU12s and TU11s are byte interleaved in the STM-1 frame of the cross connect fabric.

3. The method of claim 1, wherein the step of writing to the second page while reading from the first page according to the TU configuration information.

4. A system of switching data on a TU Level in a SONET/SDH network, the system comprising:
   an input write bus;
   a first memory element in electrical communication with the input write bus;
   a second memory element in electrical communication with the input write bus; and
   a circuitry configured to writing at least one first set of data into a first memory element or page during a first time interval, wherein the memory consists of 8 pages to store the payload data, wherein each page includes 21 locations and each location includes one byte, writing at least one second set of data into a second memory element during a second time interval, reading a portion of the first set of data from the first memory element during the second time interval and reading a portion of the second set of data from the second memory element during the first time interval, wherein the write and read operation is switched at page level by modifying the page structure of the cross connect and controlling the page number based on a TU configuration, and wherein the first time interval and second time interval are non-consecutive.

* * * * *